(12) United States Patent
Salonen (10) Patent No.: US 8,666,380 B2
(45) Date of Patent: *Mar. 4, 2014

(54) COMMUNICATION METHOD AND SYSTEM (75) Inventor: Jukka Salonen, Luhtajoki (FI)

(73) Assignee: Bookit Oy Ajanvarauspalvelu, Espoo (FI)

(*) Notice: Subject to any disclaimer, the term of this patent is extended or adjusted under 35 U.S.C. 154(b) by 320 days.

This patent is subject to a terminal disclaimer.

(21) Appl. No.: 12/944,749

(22) Filed: Nov. 12, 2010

(65) Prior Publication Data

US 2011/0281595 A1 Nov. 17, 2011

Related U.S. Application Data (63) Continuation-in-part of application No. 11/980,470, filed on Oct. 31, 2007, now Pat. No. 8,050,664, which is a continuation of application No. 10/227,194, filed on Aug. 21, 2002, now Pat. No. 7,406,429.

(30) Foreign Application Priority Data

Aug. 21, 2001 (FI) .................................. 20011680

(51) Int. Cl.
H04M 3/42 (2006.01)

(52) U.S. Cl.
USPC .................... 455/417; 455/414.1; 455/445

(58) Field of Classification Search
USPC .......... 455/412.1, 412.2, 414.1, 414.2, 414.4, 455/415, 417, 466, 424, 445; 705/1, 3, 4, 5, 705/6; 709/220, 221, 222, 224, 245, 227
See application file for complete search history.

(56) References Cited

U.S. PATENT DOCUMENTS

| 5,592,666 | A | 1/1997 | Perez |
| 5,838,965 | A | 11/1998 | Kavanagh et al. |
| 5,940,818 | A | 8/1999 | Malloy et al. |
| 5,987,467 | A | 11/1999 | Ross et al. |
| 6,003,036 | A | 12/1999 | Martin |

(Continued)

FOREIGN PATENT DOCUMENTS

| CN | 1675637 A | 10/2002 |
| EP | 0881802 A1 | 2/1998 |

(Continued)

OTHER PUBLICATIONS

Bmd wireless AG, Wireless Application Messaging Server, 2004.

(Continued)

Primary Examiner — Jean Gelin
(74) Attorney, Agent, or Firm — Barnes & Thornburg LLP (57) ABSTRACT The present invention relates generally to a method and system for communicating over a telecommunications network between a service provider and one or more users, wherein the service provider has access to multiple distinct addresses in the telecommunications network and each user is identified by an address, more specifically where a first message can be sent over at least a portion of the telecommunications network to a user's address, the reply address of the message having a first reply address selected from the multiple distinct addresses and determining, based on a reply from a user's address to the first reply address, a second message and a second reply address, wherein the second reply address can be selected from the available multiple distinct addresses and is distinct from the first reply address.

20 Claims, 8 Drawing Sheets

(56) References Cited

U.S. PATENT DOCUMENTS

| | | |
|---|---|---|
| 6,085,100 A | 7/2000 | Tarnanen |
| 6,104,870 A | 8/2000 | Frick et al. |
| 6,199,076 B1 | 3/2001 | Logan et al. |
| 6,539,360 B1 | 3/2003 | Kadaba |
| 6,560,456 B1 | 5/2003 | Lohtia et al. |
| 6,564,261 B1 | 5/2003 | Gudjonsson et al. |
| 6,639,919 B2 * | 10/2003 | Kroninger et al. ............ 370/464 |
| 6,990,332 B2 | 1/2006 | Vihinen |
| 7,149,537 B1 | 12/2006 | Kupsh et al. |
| 7,154,060 B2 | 12/2006 | Rosenbaum et al. |
| 7,222,081 B1 | 5/2007 | Sone |
| 7,406,429 B2 | 7/2008 | Salonen |
| 7,451,118 B2 | 11/2008 | McMeen et al. |
| 7,610,208 B2 | 10/2009 | Salonen |
| 7,610,224 B2 | 10/2009 | Spiegel |
| 7,615,984 B2 | 11/2009 | Kuwabara |
| 7,660,397 B2 | 2/2010 | Heen et al. |
| 8,050,664 B2 | 11/2011 | Salonen |
| 2001/0037264 A1 | 11/2001 | Husemann et al. |
| 2002/0028686 A1 | 3/2002 | Kagi |
| 2002/0032589 A1 | 3/2002 | Shah |
| 2002/0080822 A1 | 6/2002 | Brown et al. |
| 2002/0111914 A1 | 8/2002 | Terada et al. |
| 2002/0165000 A1 | 11/2002 | Fok |
| 2002/0173319 A1 | 11/2002 | Fostick |
| 2002/0188562 A1 | 12/2002 | Igarashi et al. |
| 2002/0191795 A1 | 12/2002 | Willis |
| 2003/0005126 A1 | 1/2003 | Schwartz et al. |
| 2003/0101071 A1 | 5/2003 | Salonen |
| 2003/0163536 A1 | 8/2003 | Pettine |
| 2003/0211844 A1 | 11/2003 | Omori |
| 2004/0128158 A1 | 7/2004 | Salonen |
| 2004/0128173 A1 | 7/2004 | Salonen |
| 2004/0139318 A1 | 7/2004 | Fiala et al. |
| 2004/0185883 A1 | 9/2004 | Rukman |
| 2004/0198322 A1 | 10/2004 | Mercer |
| 2005/0027608 A1 | 2/2005 | Weismuller et al. |
| 2005/0054286 A1 | 3/2005 | Kanjilal et al. |
| 2005/0065995 A1 | 3/2005 | Milstein et al. |
| 2005/0102230 A1 | 5/2005 | Haidar |
| 2005/0171738 A1 | 8/2005 | Kadaba |
| 2005/0246209 A1 | 11/2005 | Salonen |
| 2005/0268107 A1 | 12/2005 | Harris et al. |
| 2006/0010085 A1 | 1/2006 | McMeen et al. |
| 2006/0040682 A1 | 2/2006 | Goertz et al. |
| 2006/0075139 A1 | 4/2006 | Jungck |
| 2006/0131385 A1 | 6/2006 | Kim |
| 2006/0224407 A1 | 10/2006 | Mills |
| 2006/0271551 A1 | 11/2006 | Sujasto |
| 2007/0010266 A1 | 1/2007 | Chaudhuri |
| 2007/0047533 A1 | 3/2007 | Criddle et al. |
| 2007/0135101 A1 | 6/2007 | Ramati et al. |
| 2007/0143230 A1 | 6/2007 | Narainsamy et al. |
| 2008/0147408 A1 | 6/2008 | Da Palma et al. |
| 2008/0317224 A1 | 12/2008 | Salonen |
| 2009/0281929 A1 | 11/2009 | Boitet et al. |

FOREIGN PATENT DOCUMENTS

| | | |
|---|---|---|
| EP | 0967754 A2 | 12/1999 |
| EP | 1065899 A1 | 1/2001 |
| EP | 1458201 A1 | 9/2004 |
| EP | 1546938 B1 | 9/2010 |
| FI | 20011680 | 2/2003 |
| FI | 117663 | 12/2006 |
| FI | 20060387 | 10/2007 |
| FI | 118586 B | 12/2007 |
| GB | 2391646 A | 11/2004 |
| GB | 2435565 A | 8/2007 |
| KR | 20040013261 A | 2/2004 |
| WO | WO 9706603 | 2/1997 |
| WO | WO 0041102 | 7/2000 |
| WO | WO 0052601 | 9/2000 |
| WO | WO 0139033 A1 | 5/2001 |
| WO | WO 0153991 A1 | 7/2001 |
| WO | 02067602 A1 | 8/2002 |
| WO | WO 2004019223 A1 | 3/2004 |
| WO | 2006122399 A1 | 11/2006 |
| WO | WO2007063179 | 6/2007 |
| WO | 2007122292 A1 | 11/2007 |
| WO | 2007125171 A1 | 11/2007 |
| WO | 2008017695 A2 | 2/2008 |
| WO | 2010000949 A1 | 1/2010 |

OTHER PUBLICATIONS

Kauppalehti, "Mobiilipalvelujen oltava yksinkertaisia: BookIT:n Jukka Salonen uskoo tavallisiin tekstiviesteihin", Heikki Nenonen, p. 19, published Jun. 9, 2005.

Elisa Plc's press release Nov. 22, 2004, "Innovative solution receives 2004 European Good Practice Award in oppupational health and safety" and the appendix: "BookIT case.pdf".

Elisa Plc's press release Jun. 9, 2004, "Bookit Ltd and Elisa implement a handy mobile phone-enabled check-in service for Finnair" www.elisa.fi.

Finnair Plc's press release Jun. 9, 2004, "Finnair to introduce the world's easiest check-in—with a text message", www.bookit.net/news/.

Verkkouutiset Feb. 21, 2001, "Sonera tarjoaa matkaviestinoperaatoreille Content Gateway-palvelualustaa", www.verkkouutiset.fi.

Content Gateway, Version 4.0, Deployment and Billing Manual, Version 1.0, Jan. 1, 2005, TeliaSonera Finland Oy, www.sonera.fi/files/sonera.fi/.

Mouly et al, The GSM System for mobile Communications, Palaiseau 1992, pp. 556-560.

Jyrki Penttinen, GSM-tekniikka, WSOY, Porvoo 1999, pp. 25, 155-157, 222 & 331-332.

Empower Interactive Group Ltd, Virtual Mobile Redirector—Product Information Document, 2001.

Finnish Search Report May 4, 2006.

Finnish Search Report Jun. 3, 2009.

* cited by examiner

COMMUNICATION METHOD AND SYSTEM

FIELD OF THE INVENTION

The present invention relates to telecommunications. In particular, the invention relates to a method and system for communicating over a telecommunications network between an entity and one or more users.

BACKGROUND OF THE INVENTION

Services that are booked or used via the Internet are constantly increasing. The Internet enables one to use several on-line services such as services connected to banks, health services, travel agencies, vehicle maintenance, and so on.

The increasing popularity of mobile computing and communications devices introduce new challenges to services on the Internet. Mobile terminals are able to deliver information to users when needed and where needed. Users want ubiquitous access to information and applications from the device at hand. They also want to access and update this information wherever they happen to be.

It is important to notice, however, that not all the terminals will be mobile. Future services must be able to communicate with a large variety of terminal devices, both those that are mobile and those that are not. Different terminal devices have very different capabilities.

The interoperability of different services and terminal devices requires standards on several levels. It is not enough to have, say, common communication protocols. It would be very important to share common concepts and understanding what a certain piece of data means in a certain context. However, it has been very difficult to agree on those issues, as there exist an enormous number of companies, organizations, and other actors in the field.

Many services must be able to manage bookings. They include for example booking appointments for health services; booking travel reservations for hotels, airlines, and rental cars; booking tickets for venues; booking appointments for vehicle maintenance; booking maintenance for apartments; and so on. It would be very useful, if those services could get information from one another. For example, if a customer is booking tickets for a concert, he or she might want to book a table in a restaurant also. It helps, if the restaurant's booking service gets basic information, like date and customer's name from the theater's booking system. Unfortunately, there have not been methods to exchange information between different kinds of booking systems.

There are many methods to exchange information between services. Speaking of services that include booking or calendar functions, information exchange often takes place as synchronizing booking or calendar entries. For that purpose, several important standardization efforts are going on. For example, SyncML is an industry initiative to develop and promote a single, common data synchronization protocol. vCalendar is an exchange format for personal scheduling information. It is applicable to a wide variety of calendaring and scheduling products and is useful in exchanging information across a broad range of transport methods. A number of vendors have adopted the specification because it allows their products to exchange calendaring and scheduling information. vCalendar is an open specification based on industry standards such as the x/Open and XAPIA Calendaring and Scheduling API (CSA), the ISO 8601 international date and time standard and the related MIME email standards. The vCalendar format utilizes data normally stored within a calendaring and scheduling application, facilitating the cross platform exchange of information about items such as events and to-do's. An event is a calendaring and scheduling entity that represents a designated amount of time on a calendar. A to-do is a calendaring and scheduling entity that represents an action item or assignment. For instance, it may be an item of work assigned to an individual.

vCard automates the exchange of personal information typically found on a traditional business card. vCard is used in applications such as Internet mail, voice mail, Web browsers, telephony applications, call centers, video conferencing, PIMs (Personal Information Managers), PDAs (Personal Data Assistants), pagers, fax, office equipment, and smart cards. In addition to text, vCard information may include elements like pictures, company logos, live Web addresses, and so on.

As these examples show, there have been lots of efforts to build systems that can synchronize booking systems. A common problem with all of these existing solutions is that they do not provide common semantics for different systems. For example, if an entry is tentative, different systems may interpret it in different ways.

Another problem is that booking systems have multiple different and usually quite complex user interfaces. If a customer wants to both make an appointment with a dentist and book a taxi to take him or her there, the customer needs to enter all the booking information to both booking systems in different ways.

One more problem is that it becomes challenging to manage client replies, if a client has been given a number of questions. For example, it makes sense to use SMS text messages to ask client which option he or she chooses, because in many countries, like in Finland, it is very common to communicate with SMS text messages and they create revenues to operators. However, if a client replies to several inquires by sending a number of text messages, it can be troublesome to find out, which answer corresponds to a certain question because the reply does not automatically include a reference to the question. Say, a service asks a client if he or she wants to reserve—in addition to a flight ticket—also a taxi and a hotel room, and the client replies "yes" to one question but "no" to the other, the service does not necessarily know which offer the client has accepted.

SUMMARY OF THE INVENTION

It is an object of the present invention to provide a method and system for communicating over a telecommunications network in which an entity has access to multiple distinct addresses.

It is an aspect of certain embodiments of the invention to provide a method and system capable of making booking type transactions involving at least one service provider and a plurality of users who are each communicating with a mobile telephone capable of receiving and sending short text messages and/or emails.

It is further an aspect of certain embodiments of the invention to provide a method and system capable of making booking type transactions between a plurality of service providers and a plurality of users who are each communicating with a mobile telephone capable of receiving and sending short text messages and/or emails.

It is yet a further aspect of certain embodiments of the invention to allow for the mass communication over a telecommunications network with a plurality of users using some or all of a plurality of an entities multiple addresses.

BRIEF DESCRIPTION OF THE DRAWINGS

In the following section, the invention will be described in detail by the aid of a few examples of its embodiments, in which.

DESCRIPTION OF THE INVENTION

The invention relates to exchanging and synchronizing information between booking systems and user terminal devices. The services may be for example booking appointments for health services; booking travel reservations for hotels, airlines, and rental cars; booking tickets for venues; booking appointments for vehicle maintenance; booking maintenance for apartments; and so on.

Additionally, aspects of certain embodiments of the present invention relate to the mass sending of messages in accordance with that described in U.S. application Ser. No. 11/885,748 which is herein incorporated by reference.

The booking system in accordance with the invention comprises at least one service provider booking system; at least one service provider; a mediator; a client; at least one client terminal device that can be a mobile device capable of receiving text messages, and that includes a dialogue; and telecommunication connections that are used to connect the service provider booking systems, the service providers, the mediator and the client terminal device to one another.

The service providers are those with whom clients want to make appointments, reservations, or other bookings and comprise the resources for the booking system to allocate. Service providers conduct business through service provider booking services. As used in this application, the mediator is a network based service available to the service provider booking services over the network that provides additional semantics, translation and synchronization services needed for communication of the information needed for a client to complete a transaction with a service provider. The service provider booking services and the mediator are preferably applications operating on network servers such as the Internet or a private Intranet. In general, a system will comprise a plurality of service providers and service provider booking systems (implementing service provider booking services), but it is possible to have a simple booking system for only one service provider in which case the mediator and service provider could be tightly integrated into a single application.

Clients preferably include clients communicating on mobile telephones capable of receiving short text messages, such as Short Message Service (SMS) messages. Of course, a system that is capable of handling SMS messages will also handle other clients with greater capabilities. The mediator preferably communicates with mobile telephone clients through an SMS gateway, such as are operated by mobile telephone providers and a well known today. The mediator communicates with clients using dialogues. Dialogues are short messages which present information to the client and allow a simple reply. Dialogues preferably provide users with simple choices such as yes/no or to allow a selection from an ordered list. Dialogues can also be one way, such as to acknowledge a reservation. A transaction may typically involve a sequence of dialogues each involving a simple response. Dialogues involve asynchronous communication by messages. The system as described makes it possible to coordinate bookings among different service provider systems in order to fill a clients need, for example coordination of an airline booking with transportation to the airport.

Figure 1:
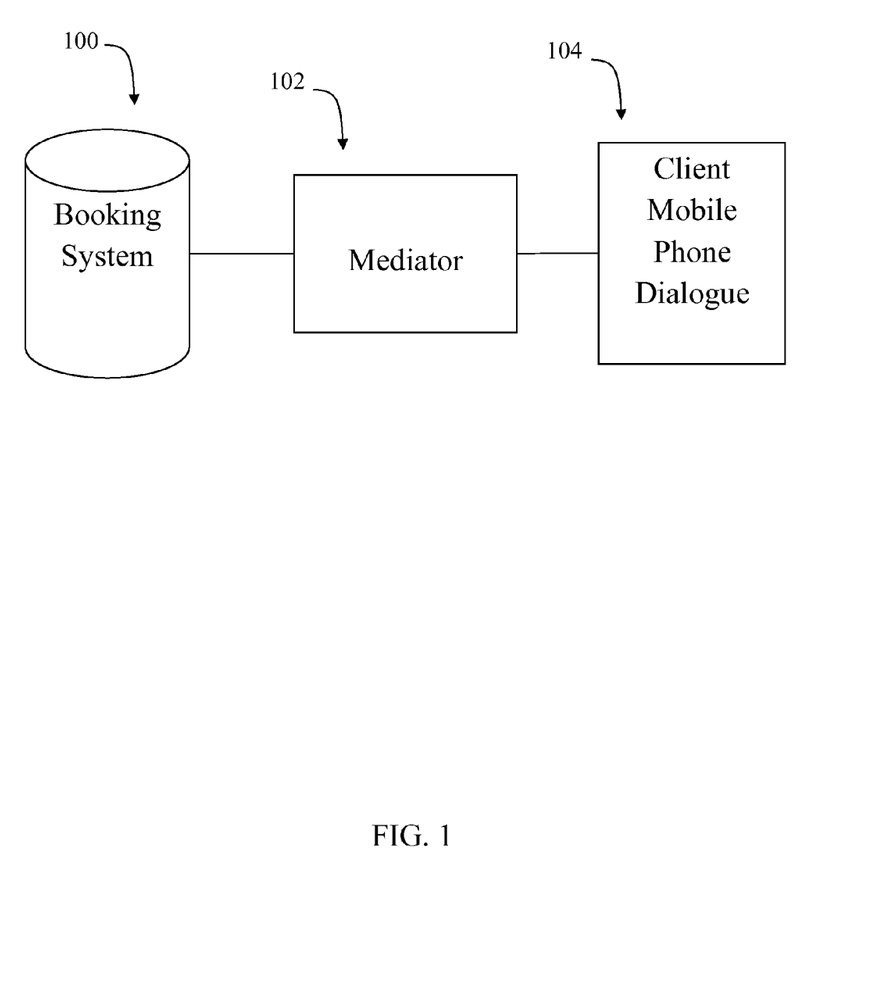
FIG. 1 represents one advantageous system in accordance with the invention.

FIG. 1 is a diagram of the simplest system comprising a single service provider booking system 100 for a single service provider, a mediator 102 communicating with the service provider over a network, and a user with a mobile phone having a dialogue entered thereon.

Figure 2:
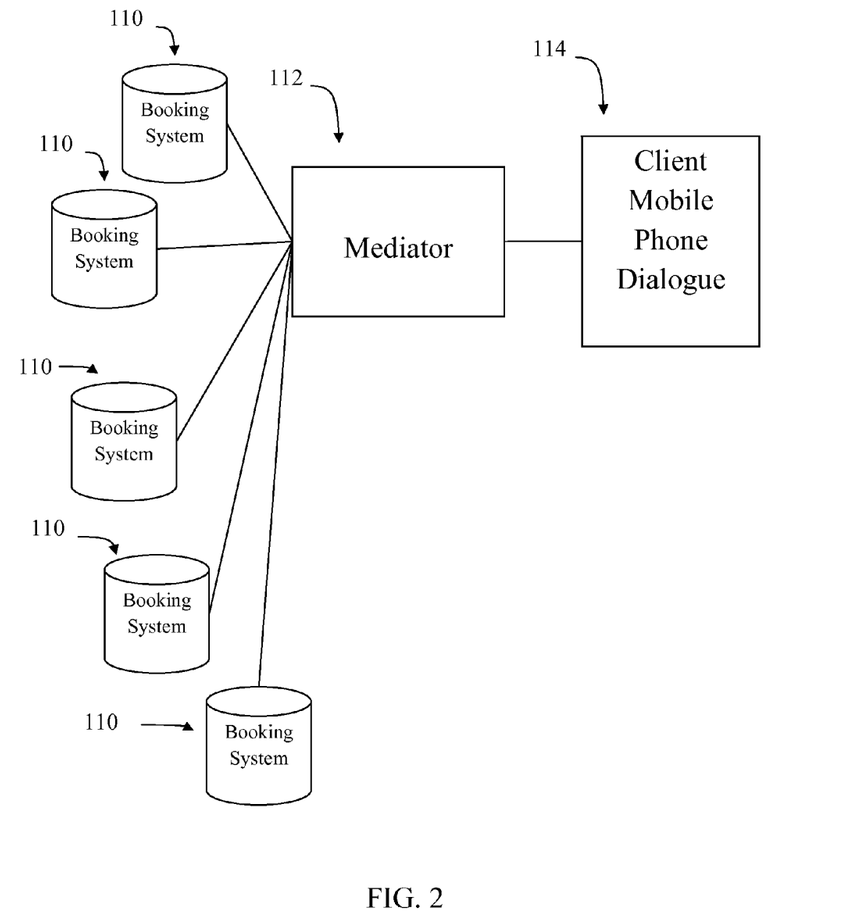
FIG. 2 represents a second advantageous system in accordance with the invention.

FIG. 2 shows a plurality of service provider booking systems communicating with a mediator over a network.

Figure 3:
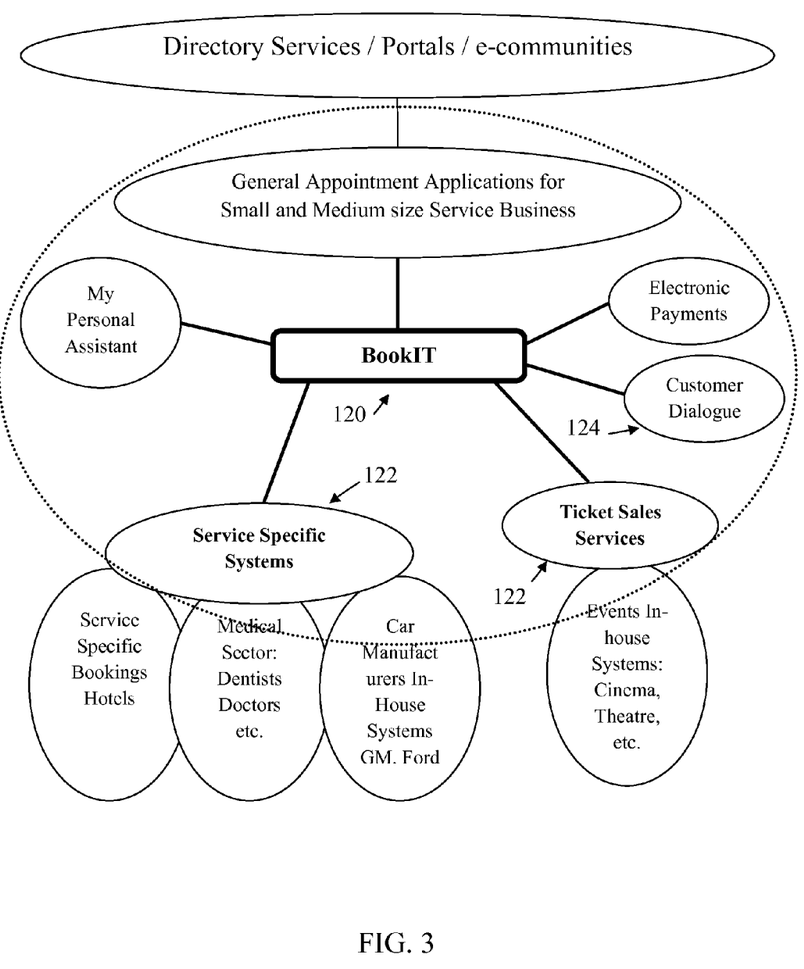
FIG. 3 represents a third advantageous system in accordance with the invention.

FIG. 3 shows a mediator named BookIT communicating with various service provider systems and users with telephone devices communicating dialogues.

A reason based customer dialogue is a desirable improvement from the client's point of view, because service providers can create their own dialogues in connection with each booking event. A dialogue is closely related to a certain booking situation. It becomes active automatically at the right moment, or the client can activate the dialogue as needed, or another entity in the system can send a message to the dialogue to activate it. The dialogue then sends an inquiry to another entity in the system or informs the client and possibly inquires client's choices. By means of this kind of dialogue, the client can make reservations in several booking systems using only one user interface. The dialogue connects to remote booking systems e.g. through the Internet or even mobile networks.

A mediator service can be capable of transmitting booking information between service provider booking systems. For example, after a booking is entered into an airline booking system, a taxi booking system can offer the client a lift to the airport. In this application, a booking is an allocation of a single resource (either the airline booking or the taxi in the previous example), while a reservation is the union of the bookings for all of the resources for the same event (the airline booking plus the taxi booking in the previous example). The dialogue between the client, the mediator and the booking systems as well as stored customer profiles ensure that the client gets the reason based service he or she needs, not intrusive advertising.

A client can make reservations as well as confirm, change, and cancel them using many kinds of communication means, including but not limited to the Internet, e-mail, and mobile terminals. The client can also synchronize a calendar provided by the mediator or a service provider with a calendar in a terminal device using mediator's synchronization functions.

A service provider can remind clients to make reservations on a regular basis and thus increase customer loyalty. A mediator can help service providers to bring their booking systems together to provide more comprehensive services without extending their businesses unnecessarily. Because of internationalization, the mediator is able to support for example many languages, time zones, currencies, and data formats.

The system, including at least a dialogue, a mediator, a service provider, and a service provider booking system, can be on one of the following levels:

1. There is a predetermined set of dialogues in the system. Their content and the possible choices are set in advance. For example, if a client books a flight, a dialogue always offers certain other bookings Client's prior actions are not taken into consideration.

2. There is an unlimited number of dynamic or "intelligent" dialogues that are based on, for instance, a profile that a client has created himself or herself, usage history records, and client's location. Simple logic supports decisions. It is a low-level expert system.

3. The system is able to make decisions by itself and to support client's decision making. On this level, a dialogue may include a high-level expert system. It can act as an agent and negotiate with several service providers to get the best offer without client's direct involvement.

In one preferred embodiment of the method, a client books a service from a service provider. The booking may be carried out using a terminal that is connected to the mediator service. First, the client connects to the mediator service using a dialogue. The client inputs reservation inquiry to the dialogue that sends the inquiry to the mediator. The mediator inquires possible reservations from service provider's information system using concepts and terminology that those services are able to interpret. The inquiry is based on client's preferences. The client discloses some preferences that are related to the specific booking when he or she inputs reservation inquiry to the dialogue. In addition, the dialogue and the mediator service may have stored client's general preferences and use them so that the client do not need to input all the preferences each time.

Managing the inquiry and bookings is based on sophisticated state models. Each booking involves several phases that are described by states that track its status through its life cycle. For example, when the mediator has inquired about a reservation from a service provider, the corresponding entry in each system has a state that the booking is pending but not confirmed. If the systems do not have common understanding what a certain state means, the mediator translates them. A preferred booking process including the phases and states is described in Example 1.

In addition to inquiring reservations from the service provider, the mediator is able to synchronize bookings in several service providers' systems. The synchronization is based on rules specified in the mediator service. For example, a rule can be that "if a client inquires booking for an airline ticket, inquire also bookings for taxis to the airport." Therefore, an inquiry from the client may be multiplied in the mediator service resulting a number of inquiries. The service providers answer to the mediator if they are able to provide requested service and they may add some additional information, like on seats or timing. The mediator combines gathered information and sends it to the dialogue that shows a simple list of options to the client. For example, the dialogue may show three options for a flight and ask if the client also wants to reserve a taxi that is actually already tentatively booked by the mediator. The client makes his or her decision by choosing the options from the simple list of alternatives. The dialogue sends information on client's choice to the mediator that confirms the bookings in accordance with client's choices and cancels the unnecessary reservations.

Figure 4:
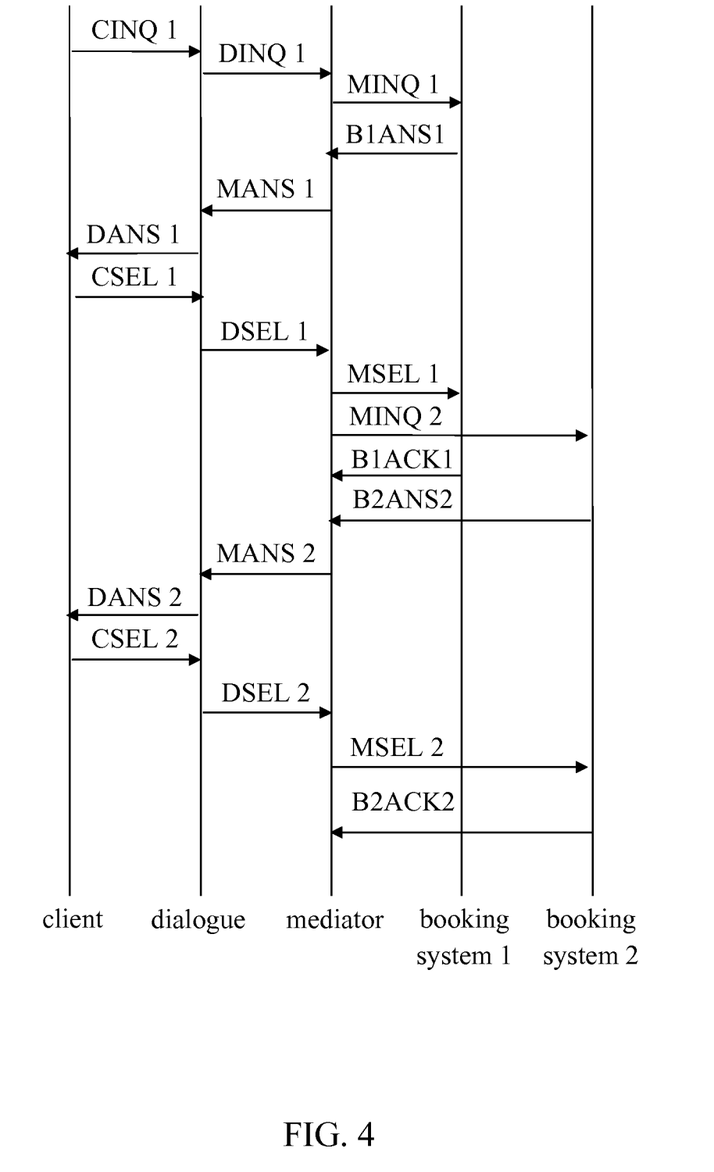
FIG. 4 is one advantageous example of a sequence diagram representing messages transmitted within a system in accordance with the invention.

FIG. 4 shows a sequence diagram of an inquiry CINQ1 originated by a client using a dialogue DINQ1 sent to the mediator. The mediator initiates the inquiry MINQ1 which corresponds to CINQ1 and DINQ1 to booking system 1 a service provider booking system. Ultimately an answer DANS1 gets back to the client offering a choice which is responded to with a selection CSEL1 resulting in a booking by the client on booking system 1. The mediator recognizes the potential need for a complementary service from booking service 2 and initiates an inquiry, MINQ2, to booking system 2, which ultimately results in a proposal including several choices, DANS2, returned to the client from which a selection, CSEL2, is made, resulting in a complementary booking on booking system 2.

The bookings can be done in other means as well, for instance, by calling the service provider with a telephone or by visiting on site the service provider's office. In that case the service provider may inform the mediator about client's bookings so that the mediator can inform the client on other options. For example, a dentist could tell the mediator that the client has booked an appointment so that the mediator may offer to book a taxi also.

Figure 5:
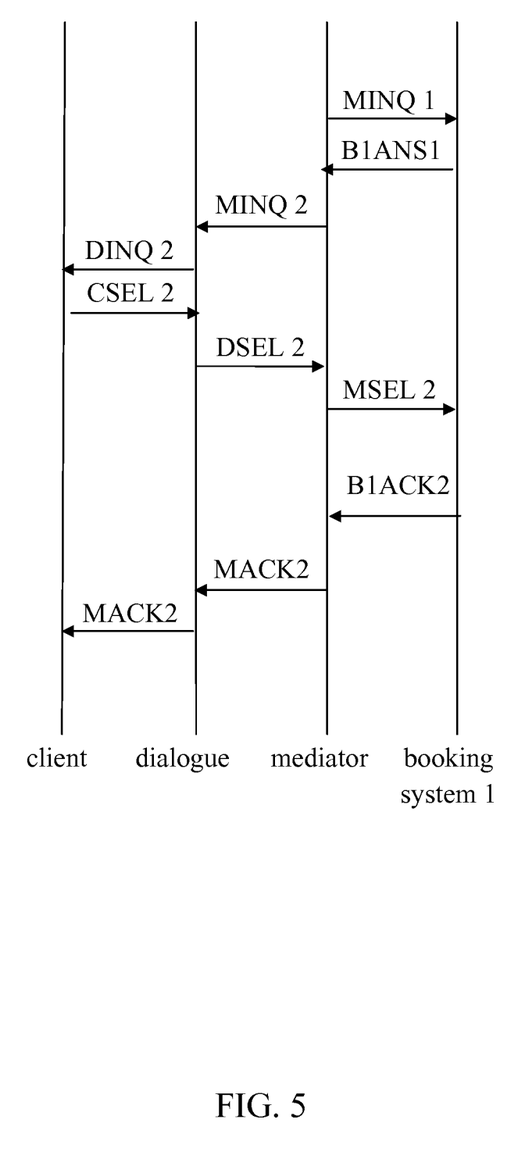
FIG. 5 is a second advantageous example of a sequence diagram representing messages transmitted within a system in accordance to an embodiment of the invention.

Also, it is possible to add a reminder to the mediator service so that the mediator asks at certain time if the client wants to make a new booking. For instance, the mediator can send a notice to the client that it has been a year since the client last had an appointment with his or her dentist and ask if the client wants to make a new appointment. This notice can already include a few options for the appointment. The mediator has checked the client's calendar if he or she has allowed that so that the given options are convenient for the client. The dialogue shows the options in a simple and handy way. The client needs only to choose which option is the best for him or her or whether he or she wants to get new options or postpone the booking FIG. 5 is a time sequence chart for such a situation where the original inquiry, MINQ1, was initiated by the mediator.

Example 1

A Preferred Booking System

A preferred booking system according to the invention is described below in terms of a system named BookIt.

BookIT is designed to interface between service provider booking systems and other parties over a network such as the Internet, and to end user clients equipped with mobile phones capable of receiving text messages. The former is preferably accomplished with a generic XML interface. BookIT supports vCard and vCalendar standards since they are used by all major booking and calendar systems.

BookIT communicates with mobile phone users using Short Message Service (SMS) via an SMS Gateway for asynchronous communication. BookIT uses the novel Dynamic Dialogue Matrix (DDM) for secure transfer and mapping of the SMS messages. The DDM is described further below.

A clear distinction needs to be made between a service provider booking process and BookIT Process. The former covers the standard booking only with time and resource reservation. The latter consists of booking, work, and financing. Both processes end to the same point. The BookIT Process consists of seven phases as follows:

Phases (Status Handling)

The phases make a bond (rubber band) between the resources. In each of the BookIT Process' phases the data related to the booking will be amended to reflect the needs of the phase in question. For the statuses and values please see the underneath table.

The phases are described in more detail in the following discussion.

1. Filing

Filing means initialization of a BookIT Process and a booking process. As a result of the initialization an entry is inserted in the database w/basic information. It will not appear in a calendar since there is no scheduling information. It can be displayed in a separate task list of the owner as an open task.

2. Requesting

In the Requesting phase a booking request is sent to the resources required for the previously filed task. Since there is no scheduling, which in most cases will be essential, this phase may be executed together with the Scheduling phase.

3. Scheduling

Schedule is given to the owner and the resources. As a part and a result of the Scheduling the following data is needed:
a suggested start-time (ISO time-stamp w/time zone)
b suggested start-location (coordinates)
c suggested end-time (ISO time-stamp w/time zone)
d suggested end-location (coordinates)

4. Confirming

Time and location as it is accepted by the resources that have accepted. Data related to this phase:
a accepted start-time (ISO time-stamp w/time zone)
b accepted start-location (coordinates)
c accepted end-time (ISO time-stamp w/time zone)
d accepted end-location (coordinates)

By default the data is copied from the Planning phase.

In practice, if planned time is not needed, the same data structures can be used for this and status indicates the actual meaning of the data.

5. Working

The resources perform the booked task. Data related to this phase consists of different attributes and their values, which are related to the actual task. In addition, following static structures are needed:
a actual start-time (ISO time-stamp w/time zone)
b actual start-location (coordinates)
c actual end-time (ISO time-stamp w/time zone)
d actual end-location (coordinates)
e products used, extras, mileage, . . . .

By default the data is copied from the Confirming phase.

6. Accounting

At this point all data stored in the data structures on previous phases is analyzed and processed for invoicing purposes.

Data related to this phase: Accounting data. To be defined separately.

7. Completing

The task has been completed. From the whole BookIT process point of view it is irrelevant whether the task succeeded or not. It is relevant to the Accounting phase, in which the financial actions to the organizer are handled. In this phase, housekeeping (database contents; temporary files, . . . ) is made in order to complete the BookIT Process.

The following table shows data available in each phase. Booking phase is in italics.

| Phase/Data | Identi-fying | Resources | Suggested time | Accepted time | Task's work related | Accounting | Closing |
|---|---|---|---|---|---|---|---|
| Filing | X | | | | | X | |
| Requesting | X | X | | | | X | |
| Scheduling | X | X | X | | | X | |
| Confirming | X | X | X | X | | X | |
| Working | X | X | X | X | X | X | |
| Accounting | X | X | X | X | X | X | |
| Completing | X | X | X | X | X | X | X |

Phase Statuses, Values, and Transitions

The following table describes the phases, their statuses, and values along with transition to next logical phase based on the values gotten. In addition, corresponding vCalendar statuses are shown when applicable.

| Phase | Satus | Next Phase | vEvent | vTodo |
|---|---|---|---|---|
| Filing | | Requesting | | |
| Requesting | | Scheduling | Sent | Sent |
| Scheduling | Pending | Confirming | Needs Action | Needs Action |
| Scheduling | Scheduled | Confirming | Needs Action | Needs Action |
| Scheduling | Re-scheduled | Confirming | Needs Action | Needs Action |
| Confirming | Accepted | Working | Confirmed | Accepted |
| Confirming | Declined | Accounting | Declined | Declined |
| Confirming | Tentative | Accounting | Tentative | |
| Confirming | Delegated | Requesting | Delegated | Delegated |
| Confirming | Re Scheduling requested | Accounting or Scheduling | | |
| Confirming | InProgress | Working | | |
| Working | InProgress | Working | | |
| Working | Delayed | Working | | |
| Working | Started | Working | | |
| Working | n % ready | Working | | |
| Working | Ready | Accounting | | |
| Accounting | | Completing | | |
| Completing | <Copied from phase before Accounting> | n/a | | |

Internal phases Paused, Re-started, and Canceled act as follows for all relevant phases at any point:

| | | |
|---|---|---|
| <Phase y> | Paused | <Status x> |
| <Phase y> | Re-started | <Status x> |
| <Phase y> | Cancelled | Accounting |

Figure 6:
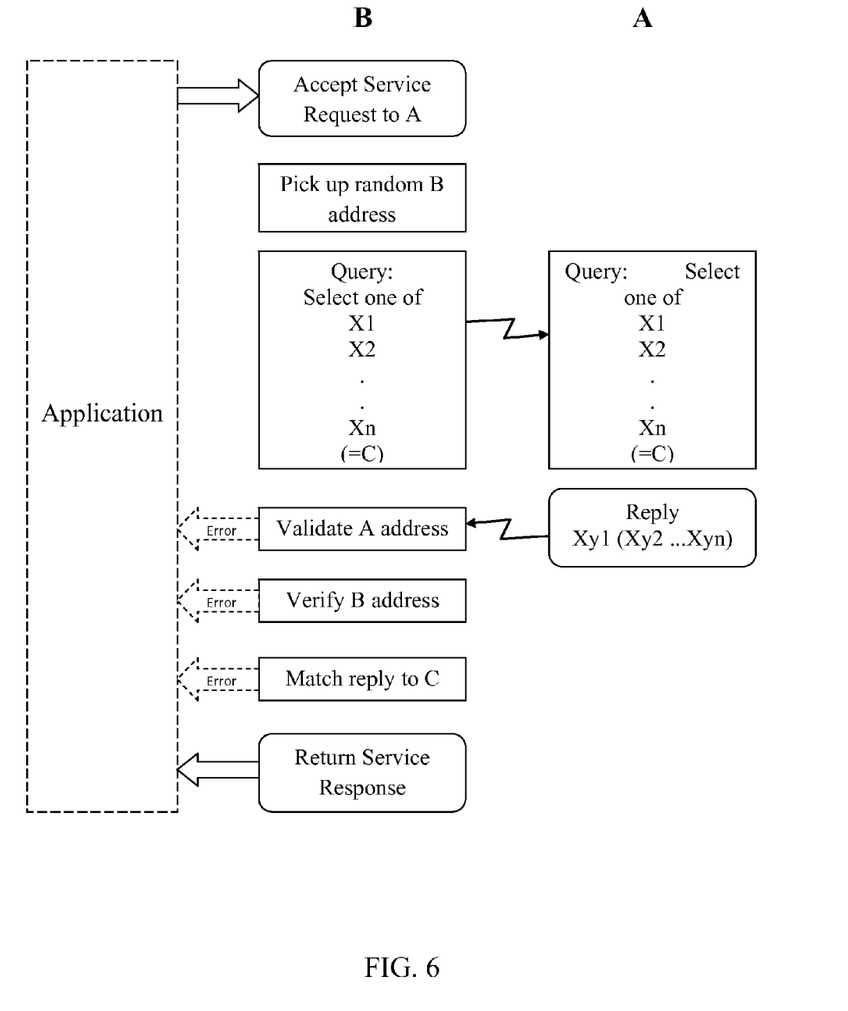
FIG. 6 shows an example of the dynamic dialog matrix applied to a query and reply according to an embodiment of invention.

It should be noted that the Canceled Status can always leads to accounting. FIG. 6 shows an example of the dynamic dialog matrix applied to a query and reply according to an embodiment of invention. For a request that is to be sent to A, a reply address B is selected. B is preferably randomly selected from a plurality of available and compatible addresses. However, B can be selected in a non-random way from a plurality of addresses.

The query which is to be sent to A contains a plurality of choices that can be selected by the user at A. The message is sent to A with a reply address of B having a known and predetermined set of acceptable responses, X1-Xn. The user at A then responds to the reply address B with preferably one, although it could be more than one, of the acceptable answers X1-Xn.

In order to clearly identify the response received at the reply address B, the system validates the sender A. This can include checking if a message has been sent to A from any address prior to the response. The check can be more complex and can check the date, time and inquiry that were sent to A as well. Once A is validated then it can be verified if the address that reply was received at was that which a message was sent from, B. Additionally, the content of the reply is matched to the plurality of acceptable responses to determine what was selected by the user at A. If the content of the reply is not, or does not contain one or more of the acceptable responses X1-Xn, or modified responses Xy1-Xyn, then the system can either notify the user of the error in reply or indicate in the system that the reply is not acceptable. If an acceptable response is received by party A to a verified reply address B then the response can be forwarded to the query initiator or service.

Confirming the (Whole) Reservation

In order for the whole Reservation to be successful, all resources, which accepted the reservation, need to have the same scheduling. In addition, there will resources in different roles and data related to the working phase may vary even greatly.

The different statuses of the whole reservation are:
a "NoReplies" (0) for "No-one hasn't replied to the request made by the organizer"
b "NoDeclines" (1) for "Not all invitees have replied yet. The ones who have replied have accepted"
c "AllAccepts" (2) for "all invitees have confirmed"
d "SomeDeclines" (3) for "Some of the invitees have declined"
e "AllDeclines" (4) for "All of the invitees have declined".

The following decision table helps in evaluating the status of the whole booking. "Maybe" means that this condition only does not incontestably specify true or false result.

subscriber's number or Calling Line Identity (CLI), or similar identification is also attached to each text message. Therefore the client or B subscriber is usually easily able to answer a message using mobile device's answer or reply function. If a mediator service that sends inquiries to a client, uses different A subscriber numbers in different inquires, it is possible to differentiate between answers based on which number the client is sending replies to. For example, if a mediator sends a client an inquiry "Do you need a taxi also?" using A subscriber number A1 and then inquiries "Do you need a hotel room?" from A subscriber number A2, client's reply to the first question goes to number A1 and the second answer goes to number A2. Using a dialog matrix, a mediator keeps track on inquires and answers. In the matrix, there is a column for each client and a row for each A subscriber number the mediator is using. Obviously, there could be a row for each client and correspondingly a column for each A subscriber number as well. After sending an inquiry from a certain A subscriber number to a client, the status and the reply is stored in the corresponding shell of the matrix. As a result, the mediator is able to find out whether the client has replied to a certain inquiry and what the answer was. Also, it is possible to use the matrix to collect information about clients' behavior and use it for example for marketing purposes. A mediator needs only a limited number of A subscriber numbers. A dialog matrix can also be used to find out which A subscriber numbers can be used when the next inquiry to a certain client is sent.

Figure 7:
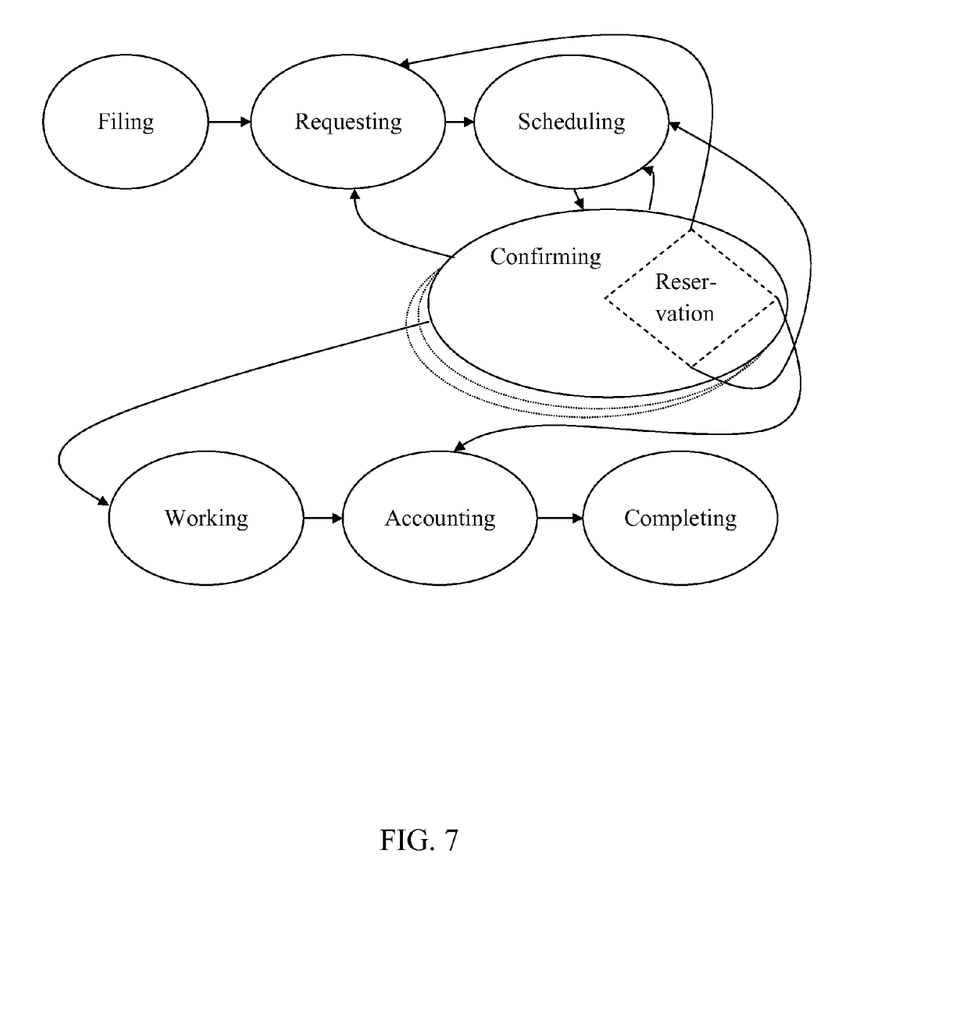
FIG. 7 shows the phases of the booking process in a preferred embodiment of the invention.

The use of the Dynamic Dialog Matrix as described above is illustrated in FIG. 7.

The Dynamic Dialog Matrix is also a powerful but very simple security measure for authenticating a mobile phone user who has only the capability of sending and receiving messages. The problem is for a service to confirm a sender's identity. One way to try to identify the user is to check the sender's address. Normally SMS, e-mail, and other alike messages have the sender's address attached. That address can be for example the sender's A-subscriber's number or Calling Line Identity (CLI), or e-mail address or IP address.

|  | Confirmations | | | | | | |
| --- | --- | --- | --- | --- | --- | --- | --- |
| Booking Status | No one answered | No one accepted | Some accepted | All accepted | No one declined | Some declined | All declined |
| NoReplies | True | Maybe | | | Maybe | | |
| NoDeclines | True | Maybe | Maybe | True | True | | |
| NoAccepts | True | True | | | Maybe | Maybe | True |
| AllAccepts | | | True | True | Maybe | | |
| SomeAccepts | | | True | Maybe | Maybe | Maybe | |
| AllDeclines | | Maybe | | | | | True |
| SomeDeclines | | Maybe | Maybe | | | True | Maybe |

Based on the information and decision table above the organizer/application has to make the decision of what to do with the reservation. That can be an automatic decision made by the system based on pre-set rules or made by the organizer manually.

One major problem solved by the invention is the challenge of managing client replies, when a client has been given a number of questions and the client is using SMS text messages or similar technology in which a reply does not automatically include an explicit reference to the inquiry. The invention solves this problem using dynamic dialog matrices. An inquiry always includes some kind of receiver's address or identification. In the SMS text message case that is so called B subscriber's number. On the other hand, sender's A However, it is quite easy to falsify a sender address. From the service provider's perspective, the downlink from a service provider to a user is usually relatively reliable and it is hard for others to capture or change messages, but the uplink from a user to a service provider is much more vulnerable and it is not too difficult to give a wrong sender's address. A well-known solution to the above problem is to use encryption technologies to secure the communications, public-key infrastructures (PKI) being good examples. For instance, a user device can be equipped with a microchip, a secure SIM card in GSM devices for example, to encrypt messages using the user's private key. Then the service provider can be sure that the message is from the user, if it can be decrypted using the user's public key. However, this solution requires special devices that are not very common, inexpensive, or standardized so far. Relying on such a solution restricts the number of potential users significantly.

Using the DDM provides a novel solution. When the service sends a request to the mobile phone user, each request contains a different, preferably randomly chosen, reply number. Thus an acceptable answer is only the one that is sent to the correct reply address.

Example 2

Use of the Dynamic Dialogue Matrix

This simple example deals with securing tickets on a morning flight tomorrow. The system sends a series of questions as SMS messages requiring a short response. Each message is earmarked so that its response can be identified so the messages need not necessarily be sent or replied to in a particular sequence unless logic so demands (for instance, if the answer to one question affects the content of the next question).

A user whose phone number is ID=0418 979 813 has requested the ticket. The system sends the following requests as individual SMS messages:
Please choose one of the following departure times:
6:00 a.m., answer A
7:30 a.m., answer B
8:15 a.m., answer C.
If none of these is OK, answer D.
Sender: +358440844 027
Please choose ticket class:
First class, answer A
Business class, answer B
Economy class, answer C
Cheapest available, answer D
Sender: +358440844 011
Please choose:
Window seat, answer A
Aisle seat, answer C
Sender: +358440844 034
Please select the meal:
Vegetarian, answer A
Beef answer B
Chicken, answer C
Sender: +358440844 003
The answers received from the customer to the preceding questions and several others were
'A' to question with ref. no +358 440 844 027
'D' to question with ref. no +358 440 844 011
'A' to question with ref. no +358 440 844 034
'B' to question with ref. no +358 440 844 003
'D' to question with ref. no +358 440 859 751
'A' to question with ref. no +358 440 844 277
'C' to question with ref. no +358 440 841 368
From this, the service provider can find out that the customer chose:
the first morning flight (=A),
cheapest available ticket (=D),
window seat (=A),
beef for meal (=B),
and etc.

It is important to note with the matrix the customer can answer the questions in any order, and can even fail to answer some questions. If these are relevant, the system can urge for an answer. If not, the system can proceed without this information.

Figure 8:
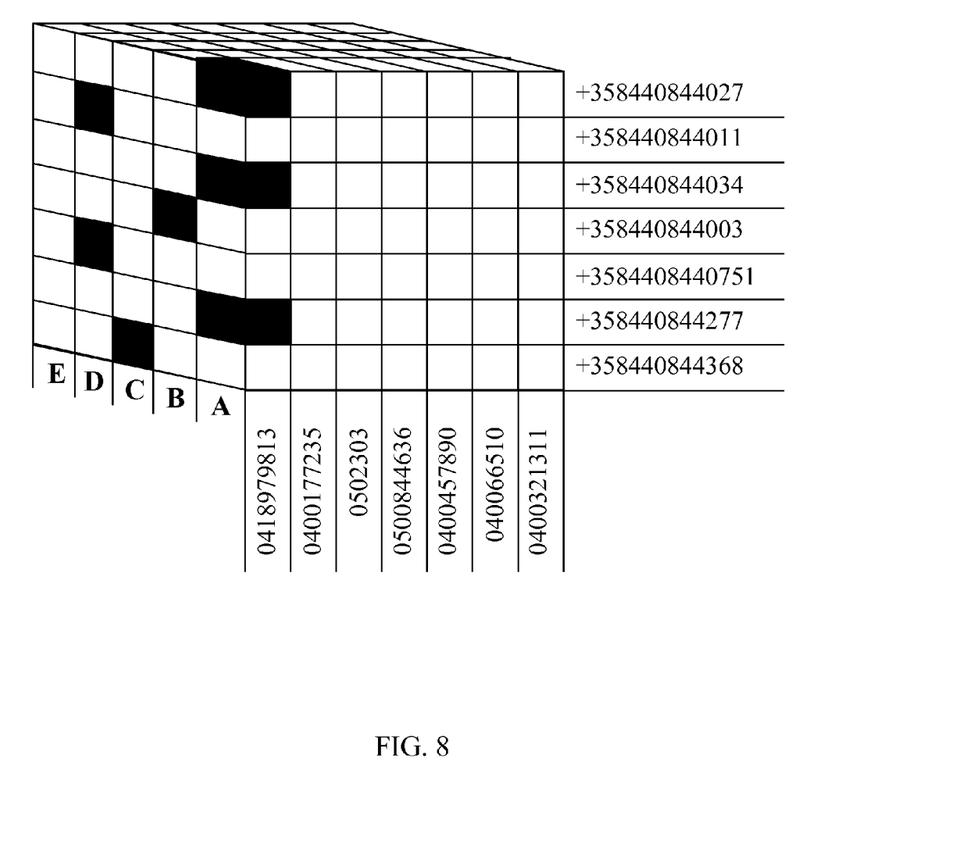
FIG. 8 shows a matrix diagram corresponding to Example 2, according to a preferred embodiment of the invention.

The above responses are shown on FIG. 8 as a three dimensional matrix with customer numbers plotted on the X-axis, reply numbers are plotted on the Y-axis and answers plotted on the Z-axis. Our user with phone number 0418 979 813 is the left most user along the X-axis. The answers are plotted along the Z-axis corresponding to the reply numbers on the Y-axis.

Additional security can be achieved using semantic analysis. In the matrix shells, there can be information about the inquiry and what kinds of answers are acceptable. If an answer does not meet the criteria, it is rejected. For example, if the service provider asks the user to tell how many items are ordered, and the user answers "yes", then apparently the user did not know what the question was and the message was not an answer for the inquiry.

It is also possible that the service provider is actually a mediator and the "real" service provider is somewhere else. In that case, only the mediator needs to have the matrix-based system and the actual service provider communicates with the mediator using either the mediator's matrix-system or other secure means like a crypto-channel. For example, a car sharing system could be implemented in the following way: cars are located randomly around a city. When a user needs a car, he or she sends a message to a mediator to ask where the nearest car is. The mediator sends a message telling the car's location. That reply comes from a random address y'. When the user reaches the car, he or she sends a message to y' telling that the rental period begins and asking the mediator to remotely release the car's locks. This message is relatively reliable, because it is sent to the address that the user only knows. Therefore it constitutes a valid reason to release the locks and start billing. The communication between mediator and the car, on the other hand, is invisible to the user and outsiders. The car can be equipped with special devices and therefore remote commands to release the locks etc. can be encrypted. Or, the communication between the car and the mediator could also be implemented using matrices. In either case, the mediator operates as a "firewall" between the user and the car disabling outsiders from unauthorized usage.

It is also possible to implement the methods and systems as described above as a mass communications system as described below.

In the first stage of service the service company or association uses combination logic and number conversion to form a large number of messages, each of which contains recipient information, the actual message content, and information on either the sender or, in practice of the address, to which a reply to the message is desired. In an SMS (short-message system) application, the recipient information is a mobile-station telephone number and the sender information is the sender data converted by a number converter, in the sender field of the SMS message.

The message can be any message whatever that can be sent over a digital communications network, and which comprises at least some or all of; recipient information, the actual message, and information on the desired reply address, for example, in the form of sender information. Besides SMS messages, such messages can be, for instance, e-mail messages, or for example multimedia messages (MMS).

A large number of the aforesaid messages are formed dynamically on the basis of complex dialogues. Correspondingly, for example in emergency applications, the message totality can be static, ready for an emergency situation.

In the conversion of the desired reply address, for example, the sender's number, the address (or number) from which the contact to the service company or association is formed, can be taken into account. This makes it possible to route the messages of US subscribers to their own national server, and correspondingly the messages of Finnish users of the same service to their own national server. From these national servers, the reply messages can be transferred for further measures by the service company or association, using suitable telecommunications connections.

The messages formed by the service company or association are sent to the mass-sending logic, which is located in the network of the operator, from where the mass sending of messages is implemented. From here, the messages are distributed according to the recipient information and arrive at the terminal device of the subscriber through the radio network in which the subscriber is at that moment. The subscriber responds to the message using the 'reply' function, in which case the reply message goes to the address that is determined by the value of the sender or reply-address field of the incoming message. The message goes to the service company or association over radio networks. Naturally, if the subscribe is in the area of the home network of the service company or association, the message will not travel over the networks. From the home network, the message is transferred to the message reception of the service company or association, where it is combined with a suitable dialogue with the aid of the combination logic and number conversion.

More concretely, for example in an SMS application, when a message is sent to the subscriber, the sending number (A number) can be converted before mass sending, for example +358500001, in the first stage of a predefined session. The number space of the sender's number (A number) can be determined by the service provider's own number space, which in can be entirely independent of the sending operator's number space. In the next stage of the same session, the A number is controlled by the logic of the service company or association, for example +358500002 and so on. The A number to be sent is determined tightly from a logically proceeding dialogue formed by the service provider, in which the reply to each message sent is expected at a specific telephone number (digital reply address), which is included as the A number in the outgoing message.

Thus, the subscriber responds to the SMS message using the reply function, in which case in the first stage of the dialogue the reply goes to the number +35800001 and correspondingly in the second stage of the dialogue to the number +3580002.

Example Dialogue:

| Message | Sending number |
|---|---|
| 1. Do you need to change tyres, reply y/n | +35850001 |
| 2. Would 07.12.2005 be a suitable date, reply y/n | +35850002 |

The subscriber's reply 'y' sends the service provider's system the message 2. The dialogue terminates, if the reply to the first message is 'n'. In stage 2, the reply 'y' leads to the time being booked, the reply 'n' leading, on the other hand, to a new booking proposal.

Thus, the messages described above would be sent as mass sendings to hundreds or thousands of recipients at one time, in which case the A number of the first stage of the dialogue would be always +35850001 and correspondingly in the second stage of the dialogue always +35850002, so that the reply to each sent message is always targeted to the correct number. In connection with the reply, the A number of the sender is, on the other hand, determined by the person for whom the booking is made.

According to an embodiment the message is an SMS message, but additionally the message can be some other kind of digital short message, in which it is possible to reply to the message without separately defining the recipient. Thus, instead of telephone-number data, the sender or reply-address field can contain the desired reply address in some other form too, for example, as an e-mail address, or as numeric or alphanumeric sender or reply-address information.

The number conversion allows reception of the message to take place typically in an open radio network outside the network of the operator who has sent the message and to be routed on the basis of the A number to the system of the service company or association.

Thus, in an SMS embodiment, before a mass sending, the information in the 'sender' field of the text message being sent can be changed, by having a different value to that of the real number of the sender entered in it. This value is obtained from the logic of the service company or association, according to a predefined rule, in such a way as to permit combination of the questions and replies arriving at the logic.

In addition, in the system of the service company or association, there is logic that connects the sending end and the receiving end, which is able to combine the sent message and the return message arriving from the external operator, in such a way that the subscriber can reply (from outside of the network) from any subscription at all, but nevertheless sending can take place from inside the network at a large capacity and economically. In other words, it is possible to select the cheapest sending operator, but reception can take place from any telecommunications network whatever.

At the message reception end, reception can be dispersed, so that, for example, reception in Sweden takes place to a local network element and in Finland correspondingly to a Finnish network element, messages received from which national network elements are transferred over suitable connections, for example IP connections for further processing arranged by the service company or association. Thus the service's international roaming will be faster and cheaper, as well as more reliable. In addition, it will be more pleasant for the consumer to use the service, because sending takes place to the number of a local operator, and not to the network of an external operator, which is assumed to be more expensive. In some subscriptions, foreign text messages are even blocked, i.e., they will not work without the service according to the invention.

One embodiment is described in the following:

There are thousands of experts, who are needed in various catastrophe and emergency situations, or in other surprising situations, when a sudden need arises to have a large group of competent people to act simultaneously. Often the situation is one in which personnel is needed in several locations simultaneously, in which case messages concerning several subjects will be sent from an emergency control centre. The necessary personnel will then receive a message in their telephone, using the system according to the invention, and each participant will reply to whichever message they regard as most suitable for themselves. Thus, the control centre can decide, on the basis of the replies, who to send and to what area.

For example, after an earthquake the emergency control centre uses the message mass-sending logic to send, to a thousand people specialized in emergency aid, messages that help and expertise are required in Area 1, Area 2, and Area 3. When a person specialized in emergency aid receives these three messages through his own operator, he is able to reply to the message that is the best alternative for him. The reply from the expert is sent over the radio network to the number defined by the message as an individual message via the service company or association to the emergency control centre.

When the message is received, the service provider's server is able to combine the information on which experts are going to each of the Areas 1-3. Thus the emergency control centre can immediately act and rapidly forward the necessary personnel and equipment to the location in question.

One application can be also the creation of a link to a person who travels globally in the service of an international major corporation. Large corporations typically have their own message communications centres, responding to the messages sent by which is difficult using existing technology, because if, for example, an American receives a group message from his company when he is in India, the 'reply' function cannot be used to reply to the message, because using existing technology there is a non-international number in the sender field. Accordingly, both international roaming and also the further processing of the reply to the message are solved.

If, according to what is stated above, a person who is a subscriber wishes to reply only to telephone numbers with the code of his own country, the service provider can send from his own country group messages as a mass sending, in which the number of the sender is converted to an internal number of the recipient's country and the recipients can reply in their own area, without international numbers. In that case, the service provider will require servers in the country in question. Reply messages from the country-specific server are transmitted, for instance, over an IP connection to a server in the service provider's country, in which there is combination logic.

A number external to the network can thus be converted into the sender's identifier (=the desired reply address), so that it must return through the radio interface of the network. Thus, in the reply situation the message is not routed directly to a service number inside the network, but instead through a radio interface outside the network, so that it roams automatically. For this operation, in one preferred embodiment of the invention there is, thus, not the short number 16400, but instead the fully roaming international number +358 5016400.

For example, a thousand messages are sent at one time using a mass-messaging application, in such a way that each individual message is given converted sender information for the reply message, so that the return messages arrive at different times (as people gradually reply) through several radio modems, so that the momentary capacity required for each radio modem will be small. However, with the aid of features of embodiments of the invention, the functioning of services outside the service provider's home country, i.e. roaming operation, is achieved.

In such an application, the term sender information refers to both a telephone number (A number) and to any information whatever, transported with a message, concerning the desired return address.

The method and system according to the invention can be implemented with the aid of at least one computer in a telecommunications network.

An application environment of the solution according to the invention is disclosed in publication WO 2004/019223, Booking System, which is herein incorporated by reference, messages sent by the system applied to which can be implemented using the mass-sending method according to the present invention.

Although the present invention has been described in considerable detail with reference to certain preferred versions thereof, other versions are possible. Therefore the spirit and scope of the appended claims should not be limited to the preferred versions herein.

The invention claimed is:

1. A method comprising:
communicating over a telecommunications network between a service provider and one or more users, wherein the service provider has access to multiple distinct addresses in the telecommunications network and each user is identified by an address;
causing a first message to be sent over at least a portion of the telecommunications network to a user's address, wherein the first message has a first reply address selected from the multiple distinct addresses;
determining, based on a reply from the user's address to the first reply address, a second message and a second reply address, wherein the second reply address is selected from the available multiple distinct addresses and is distinct from the first reply address; and
causing the second message to be sent over at least a portion of the telecommunications network to the user's address, the reply address of the second message being the second reply address.

2. The method of claim 1, further comprising causing the first message to be sent over at least a portion of the telecommunications network to at least one additional user's address, the reply address of each first message being the first reply address.

3. The method of claim 2, wherein the determined second message and second reply address, for each user which replies in same or similar manner to the first message, are the same.

4. The method of claim 2, wherein the plurality of first messages are sent at substantially the same time to the plurality of users.

5. The method of claim 2, wherein a plurality of first messages are sent at different times to the plurality of users.

6. The method of claim 3, wherein one or more second messages are sent from the second reply address at different times.

7. The method of claim 6, wherein the first message is sent to at least one user from the first reply address at a time after a second message has been sent to at least one user from the second reply address.

8. The method of claim 1, further comprising; storing, for each message sent, the user's address and the reply address.

9. The method of claim 1, wherein at least one reply address is selected for a user from the available multiple distinct addresses so that it is compatible with the user's address.

10. The method of claim 1, further comprising; causing the first message to be sent over at least a portion of the telecommunications network to at least one additional user's address, the reply address of each first message being selected for each user so that it is compatible with the user's address.

11. The method of claim 1, wherein the first reply address, the second reply address and the user's address are all unique phone numbers.

12. The method of claim 10, wherein determining the first and second reply addresses includes determining a portion of the telecommunications network that each user's address is a part of and selecting an available reply address which is a part of the same or compatible portion of the telecommunications network.

13. The method of claim 12, wherein the first reply address and the second reply address are short numbers compatible with the operator of the portion of the telecommunications network that the a user's address belongs to or is compatible with.

14. The method of claim 1, wherein the first message contains one or more response options.

15. The method of claim 14, wherein at least one of the one or more response options is a single character response.

16. The method of claim 15, wherein the content of the second message is chosen or created based on the response selected by the user from the one or more response options.

17. The method of claim 15, wherein the second reply address is selected based on the response selected by the first user from the one or more response options.

18. The method of claim 1, wherein at least one message is an SMS message, MMS message or e-mail message.

19. The method of claim 1, wherein the multiple distinct addresses are comprised of multiple distinct addresses from multiple distinct telecommunications operators.

20. A network server configured to:
communicate over a telecommunications network with one or more users, wherein the network server has access to multiple distinct addresses in the telecommunications network and each user is identified by an address;
cause a first message to be sent over at least a portion of the telecommunications network t a user's address, wherein the first message has a first reply address selected from the multiple distinct addresses;
determine, based on a reply from the user's address to the first reply address, a second message and a second reply address, wherein the second reply address is selected from the available multiple distinct addresses and is distinct from the first reply address; and
cause the second message to be sent over at least a portion of the telecommunications network to the user's address, the reply address of the second message being the second reply address.

* * * * *